(12) United States Patent
Jain et al.

(10) Patent No.: US 7,986,948 B2
(45) Date of Patent: Jul. 26, 2011

(54) WIRELESS HANDOFFS BETWEEN MULTIPLE NETWORKS

(75) Inventors: Nikhil Jain, San Diego, CA (US);
Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 12/419,235

(22) Filed: Apr. 6, 2009

(65) Prior Publication Data
US 2009/0191876 A1    Jul. 30, 2009

Related U.S. Application Data

(63) Continuation of application No. 11/155,796, filed on Jun. 16, 2005, now Pat. No. 7,515,909.

(60) Provisional application No. 60/674,110, filed on Apr. 21, 2005.

(51) Int. Cl.
*H04W 36/00*    (2009.01)
(52) U.S. Cl. ......... 455/436; 455/437; 455/438; 455/439
(58) Field of Classification Search .................. 455/436, 455/437, 438, 439
See application file for complete search history.

(56) References Cited

U.S. PATENT DOCUMENTS

| 6,904,029 | B2 | 6/2005 | Fors et al. |
| 7,039,027 | B2 | 5/2006 | Bridgelall |
| 7,082,301 | B2 | 7/2006 | Jagadeesan et al. |
| 7,082,304 | B2 | 7/2006 | Jagadeesan et al. |
| 7,161,915 | B2 * | 1/2007 | Womack et al. ............... 370/332 |
| 7,164,915 | B2 | 1/2007 | Zaki |
| 7,245,915 | B2 | 7/2007 | Matta et al. |
| 2002/0110105 | A1 | 8/2002 | Awater et al. |
| 2002/0168980 | A1 * | 11/2002 | Gwon et al. ................... 455/437 |
| 2003/0165124 | A1 | 9/2003 | Alperovich et al. |
| 2004/0121777 | A1 | 6/2004 | Schwarz et al. |
| 2004/0264427 | A1 | 12/2004 | Jaakkola et al. |
| 2005/0271011 | A1 | 12/2005 | Alemany et al. |
| 2006/0019653 | A1 | 1/2006 | Stamoulis et al. |
| 2006/0217112 | A1 | 9/2006 | Mo |
| 2007/0109980 | A1 | 5/2007 | Atwater et al. |

FOREIGN PATENT DOCUMENTS

| EP | 1435748 | | 7/2004 |
| EP | 1474946 | A1 | 11/2004 |
| EP | 1503606 | A1 | 2/2005 |
| WO | WO200457899 | | 7/2004 |

(Continued)

OTHER PUBLICATIONS

International Search Report, PCT/US2006/015255—International Search Authority—European Patent Office—Aug. 21, 2006.

(Continued)

*Primary Examiner* — Barry W Taylor
(74) *Attorney, Agent, or Firm* — Albert Harnois; Kam T. Tam; Alin Corie

(57) ABSTRACT

The disclosure is directed to a mobile communication device, and method for handing off a mobile communications device between two networks. A processor in the mobile device may be used to establish a network connection with a server in a first network while supporting a call in a second network. The mobile device may also include a transceiver that receives information from the server relating to the network connection. The processor may use the information, local measurements, or both to determine whether to handoff the call to the first network.

28 Claims, 4 Drawing Sheets

FOREIGN PATENT DOCUMENTS

| WO | 2005209881 | 3/2005 |
| WO | WO200527556 | 3/2005 |

OTHER PUBLICATIONS

International Preliminary Report on Patentability—PCT/US2006/015255—International Preliminary Examining Authority—European Patent Office—Jul. 9, 2007.

Written Opinion, PCT/US2006/015255—International Search Authority—European Patent Office—Aug. 21, 2006.

European Search Report—EP10009985, Search Authority—Munich Patent Office, Nov. 4, 2010.

Hideaki Ono et al., "A Study of Application-oriented Handover Technology," report of technology research of The Institute of Electronics, Information and Communication Engineers, Feb. 27, 2004, vol.692, No. 103, pp. 279-282.

Taiwanese Search report—TW095114360—Search Authority-TIPO-Nov. 10, 2009.

* cited by examiner

WIRELESS HANDOFFS BETWEEN MULTIPLE NETWORKS

CROSS REFERENCE TO RELATED APPLICATIONS

The present application is a continuation of U.S. patent application Ser. No. 11/155,796, filed Jun. 16, 2005 and titled WIRLESS HANDOFFS BETWEEN MULTIPLE NETWORKS, which claims the benefit of the filing date of U.S. provisional application 60/674,110, filed on Apr. 21, 2005 and titled TRIGGERS FOR WAN TO LAN HANDOFFS, both of which are hereby expressly incorporated by reference.

BACKGROUND

1. Field

The present disclosure relates generally to telecommunications, and more particularly, to systems and methods to support the handoff of a mobile communications device from one network to another in a wireless communications system.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area cellular networks and wireless local area networks (LAN). Wireless LANs generally provide telephony and data services over relatively small geographic regions using a standard protocol, such as IEEE 802.11, Bluetooth, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks. Additional techniques have been employed to support the handoff of a mobile user as it travels from one network coverage region to another. However, quality performance may be enhanced in some instances if the decision to handoff a mobile user depends not only on the location of the mobile user, but also the quality of service of the networks.

SUMMARY

One aspect of a mobile communications device is disclosed. The mobile communications device includes a processor configured to establish a network connection with a server in a first network while supporting a call over a second network, and a transceiver configured to provide information received from the server to the processor, the information relating to the network connection. The processor is further configured to determine whether to handoff the call to the first network based on the information.

Another aspect of a mobile communications device is disclosed. The mobile communications device includes a processor configured to establish a network connection with a server in a first network while supporting a call over a second network. The processor is further configured to measure at least one of delay, jitter, packet loss or data error rate over the network connection in the forward direction, and determine whether to handoff the call to the first network based on said at least one measurement.

One aspect of a method of communicating from a mobile communications device in a multiple network environment is disclosed. The method includes establishing a network connection with a server in a first network while supporting a call over a second network, receiving information from the server relating to the network connection, and determining whether to handoff the call to the first network based on the information.

Another aspect of a method of communicating from a mobile device in a multiple network environment is disclosed. The method includes establishing a network connection with a server in a first network while supporting a call over a second network, measuring at least one of delay, jitter, packet loss or data error rate over the network connection in the forward direction, and determining whether to handoff the call to the first network based on said at least one measurement.

A further aspect of a mobile communications device is disclosed. The mobile communications device includes means for establishing a network connection with a server in a network while supporting a call over a second network, means for receiving information from the server relating to the network connection, and means for determining whether to handoff the call to the first network based on the information.

Yet, a further aspect of a mobile communications device is disclosed. The mobile communications device includes means for establishing a network connection with a server in a first network while supporting a call with a second network, means for measuring at least one of delay, jitter, packet loss, or data error rate over the network connection in the forward direction, and means for determining whether to handoff the call to the first network based on said at least one measurement.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various techniques will be described in connection with the handoff of a mobile user from one network to another. A number of these techniques will be described in the context of a mobile communications device traveling through a wide area cellular network with one or more wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching between a CDMA2000 1x network and a GSM network. Accordingly, any reference to a cellular phone capable of communicating with an IEEE 802.11 network, or any other specific embodiment, is intended only to illustrate various aspects of the present invention, with the understanding that these aspects have a wide range of applications.

Figure 1:
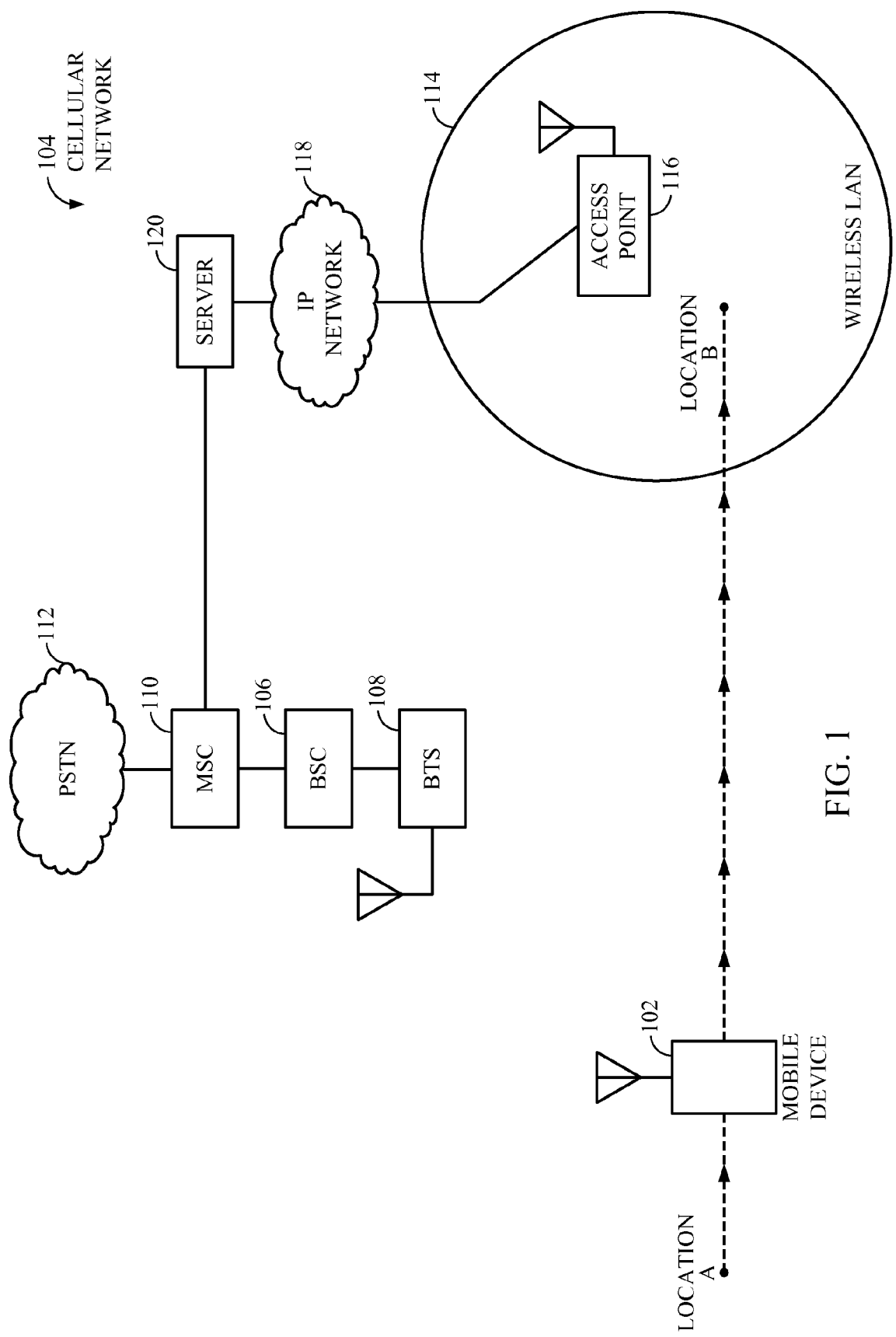
FIG. 1 is a conceptual block diagram of an embodiment of a wireless communications system.

FIG. 1 is a conceptual block diagram of an embodiment of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1 for simplicity of explanation. A mobile switching center (MSC) 110 may be used to provide a gateway to a public switched telephone network (PSTN) 112. Although not shown in FIG. 1, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

The cellular network 104 may also include one or more wireless LANs dispersed throughout the cellular coverage region. A single wireless LAN 114 is shown in FIG. 1. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

As the mobile device 102 moves through the cellular network 104 from location A to location B in the depicted embodiment, it begins to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a network connection with the server 120. The term "network connection" refers not only to the network layer connection between the mobile device 102 and the server 120, but also the lower layer connections required to support the network connection, including the physical layer connections. Once the network connection is established, information from the server 120 can be used in conjunction with local measurements to determine whether the service quality of the wireless LAN 114 is sufficient to handoff the mobile device 102 to the access point 116. Examples of local measurements made by the mobile device 102 and information received from the server 120 will be described in greater detail later.

The handoff to the access point 116 may be a soft handoff or a hard handoff. Soft handoff is the process of establishing an air traffic link with the access point 116 in the wireless LAN 114 before breaking the existing air traffic link with the BTS 108 in the cellular network 104. Not only does this approach reduce the probability of dropped calls, but it also makes the handoff virtually undetectable to the user. A soft handoff may be implemented in a mobile device 102 with separate cellular and wireless LAN transceivers.

A hard hand off entails a brief disconnection from the BTS 108 servicing the call prior to establishing an air traffic link with the access point 116. A hard handoff may be utilized for any number of reasons. By way of example, a hard handoff may be required for a mobile device 102 with a single transceiver which is tuned as part of the handoff process. Alternatively, a mobile device 102, capable of soft handoff, may use a hard handoff in the case of frame offsets, misalignment, or in the case where the mobile device 102 is being handed off to an access point in a wireless LAN outside the cellular network 104.

An example of a handoff from the BTS 108 to the access point 116 will now be described. Once the mobile device 102 has determined from the local measurements and server information to initiate a handoff to the access point 116, the mobile device 102 sends a handoff request to the server 120 over the network connection 120. The server 120 determines whether the access point 116 has available resources to handle the call, and if so, sends a handoff message to the MSC 110. The handoff message is used by the MSC 110 to notify the BTS 108 of the handoff to the wireless LAN 114. The server 120 also sends a handoff command to the mobile device 102. In response to the handoff command, the mobile device 102 tears down the existing air traffic link with the BTS 108 and establishing a new air traffic link with the access point 116. Once the new air traffic link is established with the access point 116, the server 120 signals the MSC 110 to indicate that the handoff is complete. The mobile device 102 can now support cellular services using the wireless LAN 114.

As the mobile device 102 uses the wireless LAN 114 for cellular services, it continues to monitor the service quality of the connection from information received by the server 120 and local measurements. Should the service quality of the wireless LAN 114 drop below an acceptable level, the mobile device 102 may initiate a handoff back to the cellular network 104. The handoff back to the cellular network 104 may be initiated by the mobile device 102 by sending a handoff request to the server 120 over the network connection. In one embodiment, the server 120 determines whether to grant or deny the mobile device's request based on any suitable criteria. In another embodiment, the server 120 is given no discretion to deny the request. Either way, the server 120 sends a handoff message to the MSC 110 as part of the handoff procedure. The handoff message is used by the MSC 110 to find a target BTS with available resources. The MSC then notifies the target base station to prepare resources for the handoff and sends a handoff command back to the server 120. In response to the handoff command, the server 120 instructs the mobile device 102 to move to the target BTS. The mobile device 102 accomplishes this by tearing down the existing air traffic link with the access point 116 and establishing a new air traffic link with the target BTS. Once the new air traffic link is established with the target BTS, the target BTS signals the MSC 110 to indicate that the handoff is complete, and resumes use of the cellular network 104 for cellular services.

Figure 2:
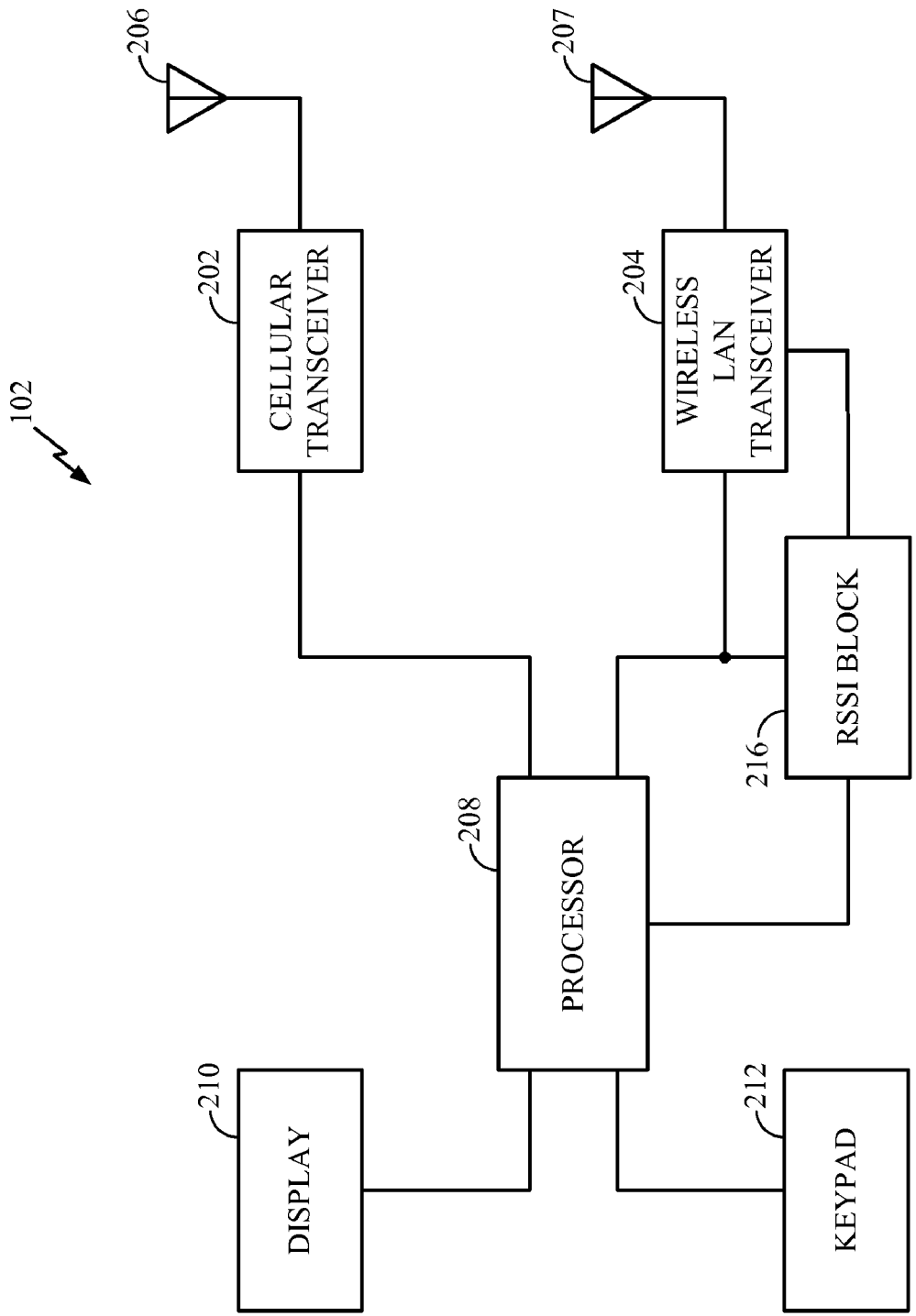
FIG. 2 is a functional block diagram illustrating an example of a mobile device capable of supporting both cellular and wireless LAN communications.

FIG. 2 is a functional block diagram illustrating an example of a mobile device capable of supporting both cellular and wireless LAN communications. The mobile device 102 may include a cellular transceiver 202 and a wireless LAN transceiver 204. In at least one embodiment of the mobile device 102, the cellular transceiver 202 is capable of supporting CDMA2000 1x communications with a BTS (not shown), and the wireless LAN transceiver 204 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 202, 204 is shown with a separate antenna 206, 207, respectively, but the transceivers 202, 204 could share a single broadband antenna. Each antenna 206, 207 may be implemented with one or more radiating elements.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application.

The processor 208 may be configured to execute an algorithm to trigger a handoff from one network to another. The algorithm may be implemented as one or more software applications supported by the microprocessor based architecture discussed earlier. Alternatively, the algorithm may be a module separate from the processor 208. The module may be implemented in hardware, software, firmware, or any combination thereof. Depending on the specific design constraints, the algorithm could be integrated into any entity in the mobile device 102, or distributed across multiple entities in the mobile device 102.

The criteria used by the algorithm to trigger a handoff may vary depending on the specific implementation. Referring to FIG. 1, the criteria may include local measurements made by the mobile device 102 and information provided by the server 120. This criteria may be used to generate a request to handoff the mobile device 102 from the BTS 108 to the access point 116 when the service quality of the wireless LAN 114 is acceptable. In a similar manner, the same criteria can be used to generate a request to handoff the mobile device 102 back to the BTS 108 when the service quality drops below an acceptable level. The manner in which the algorithm manipulates this criteria to generate handoff requests may vary depending on the particular embodiment of the mobile device 102. Those skilled in the art will readily understand how to best manipulate the criteria for any particular application.

The local measurements made by the mobile device 102 may include various metrics which indicate the quality of the network connection. By way of example, the mobile device 102 may measure the signal strength of the transmission from the access point 116. In telephony applications, delay, jitter or packet loss may also be used as reliable quality metrics relating to the network connection in the forward direction. The term "forward direction" refers to transmissions over the network connection from the server 120 to the mobile device 102, and the term "reverse direction" refers to transmissions over the network connection from the mobile device 102 to the server 120. The data error rate may also be used as an additional quality metric of the forward direction network connection. The "data error rate" may take the form of the bit-error-rate (BER), frame-error-rate (FER), packet-error-rate, or any other error rate measurement which indicates whether one or more bits of data are corrupted.

The information provided by the server 120 may include data that indicates the loading on the access point 116, historical information relating to the performance of the access point 116, quality metrics such as data error rate, delay, jitter, or packet loss in the reverse direction, or any other information that bears on the quality of the network connection.

Referring to FIGS. 1 and 2, the signal strength from the access point may be measured at the mobile device 102 with a received signal strength indicator (RSSI) block 216. The RSSI is most likely an existing signal that is fed back to the wireless LAN transceiver 202 for automatic gain control, and therefore, can be provided to the processor 208 without increasing the circuit complexity of the mobile device 102. Alternatively, the quality of the radio connection may be determined from the beacon. Since the beacon is a spread-spectrum signal that is known, a priori, a replica of the beacon can be stored in memory (not shown) at the mobile device 102. The demodulated beacon may be used with the replica beacon stored in memory to estimate the energy of the transmitted beacon by means well known in the art.

The algorithm may also be used to compute various quality metrics relating to the network connection in the forward direction. As indicated earlier, one of these quality metrics is the delay across the network connection in the forward direction. In telephony applications, excessive delay may result in poor quality due to undesirable echoes or talker overlap. The algorithm may be configured to measure the delay by any suitable means. In at least one embodiment of the wireless communications system, date and time stamps may be used with packets transmitted from the server 120 to measure delay across the network connection. More specifically, when a forward direction transmission is received by the mobile device 102, the time stamp can be extracted in the processor 208 and compared to a local clock internal (not shown) in the mobile device 102. The result, which represents the delay over the network connection in the forward direction, may be stored in memory (not shown). The algorithm may determine whether to handoff the mobile device 102 from one network to another using the delay value stored memory for the most recent transmission, or alternatively, the average delay from multiple delay values.

The use of time stamps to measure delay across the network connection requires that the local clock be synchronized with the server 120. A remote time source (not shown) may be used to synchronize the mobile device 102 to the server 120. The remote time source may be one of numerous servers in the IP network 118 that are synchronized to Universal Time Coordinated (UTC) via radio, satellite, modem, or other means. The remote time source may be used to provide time information to update or synchronize the internal clock in the mobile device 102. This may be achieved with a software program known as Network Time Protocol (NTP). NTP is an Internet standard protocol for synchronizing clocks to some time reference. NTP may be run in the processor 208, or elsewhere in the mobile device 102.

The problems with delay in telephony applications may be further compounded by the need to remove jitter. Jitter is the variation in the delay of packets due to network congestion, timing drift, or route changes. Removing jitter requires buffering arriving packets so that all the packets can be continuously played in the correct order. The process of buffering packets adds additional delay. Thus, the algorithm may be further configured to measure the jitter over the network connection in the forward direction as an additional quality metric. In the case of an adaptive jitter buffer, which adapts to changes in the network's delay, the delay measured by the algorithm may include network jitter, depending on where the measurement is made in the processing path. In the case of a fixed jitter buffer, which introduces a fixed delay to the packet, the algorithm may measure the network jitter from the variations in the delay values stored in memory. The algorithm may determine whether to handoff the mobile device from one network to another using the worst case variation of delay values, the average variation of delay values, or any other suitable computational methodology.

Lost packets can be especially problematic in telephony applications. Because IP networks do not guarantee service, they will usually exhibit a high incidence of lost packets. In IP networks, voice packets are treated the same as data. As a result, voice packets will be dropped equally with data packets when the IP network is heavily congested. Unlike data packets, however, lost voice packets cannot be simply retransmitted at a later time. The algorithm may also be used to compute a quality metric relating to lost packets by any suitable means. By way of example, packets transmitted from the server 120 can also include sequence numbers, in addition to time and date stamps. When the forward direction transmission is received by the mobile device 102, the sequence numbers can be extracted in the processor 208 and used by the algorithm. Based on the sequence numbers, the algorithm can determine which packets have been lost.

As discussed earlier, various signal processing functions may be performed by the processor 208 such as convolutional encoding, CRC functions, modulation, and spread-spectrum processing. The CRC function may also be used by the processor 208 to compute the FER by means well known in the art. The FER may be used by the algorithm as a quality metric of the network connection in the forward direction in determining whether to handoff the mobile device 102 from one network to another. Alternatively, or in addition to the CRC function, other data error detection techniques may be used to derive quality metrics including a checksum and parity bit, just to name a few.

In addition to the quality metrics described above, the algorithm may use information from the server 120 to determine whether to handoff the mobile device 102 from one network to another. As described earlier, the information may be related to the loading on the access point 116. Although the wireless LAN 114 utilizes a wide spectrum to support communications, the overhead may limit the number of mobile users that can be supported by the access point 116. Moreover, the presence of other mobile users in the vicinity of the wireless LAN 114 may put additional loading on the access point 116. The server 120 may be configured to maintain a database which includes every mobile user that is supported by the wireless LAN 114 via the access point 116. This information may be provided to the mobile device 102 over the network connection. The algorithm may use this information to determine whether to request a handoff of the mobile device 102 from one network to another.

The information provided by the server 120 to the mobile device 102 may also include historical information about the access point 116. By way of example, the server 120 can monitor the number of dropped calls by the access point 116 by means well known in the art. This information can be stored in the server's database and transmitted to the mobile device 102 once a network connection is established. The algorithm in the mobile device 102 may use the information to assist it in evaluating the loading at the access point 116. If there is a high incidence of dropped calls by the access point 116, the algorithm may generate the necessary requests to keep the call on the cellular network even when the access point is only moderately loaded. Conversely, if the incidence of dropped calls is low, the algorithm may take a more aggressive approach and decide to generate the necessary requests to keep the call on the wireless LAN 114 even if the access point 116 is heavily loaded.

The information may also include various quality metrics computed by the server 120 relating to the network connection in the reverse direction. These quality metrics may include data rate error, delay, jitter, lost packets, and any other parameters that bear on the quality of the network connection. The server 120 may compute these quality metrics in the same manner described above in connection with the algorithm, or by any other suitable means. A CRC function may be used by the server 120 to compute the FER from the CRC value embedded in frame transmitted over the network connection in the reverse direction. To the extent delay or jitter is computed using date and time stamps with the control signals transmitted from the mobile device 102 over the network connection, NTP may be used by the server 120 to synchronize its internal clock. Sequence numbers embedded in the control signals by the mobile device 102 may also be used by the server 120 to identify lost packets. These quality metrics may be used by the algorithm in conjunction with the quality metrics measured by the mobile device 102 to provide a complete picture of the network connection in both the forward and reverse directions.

Figure 3:
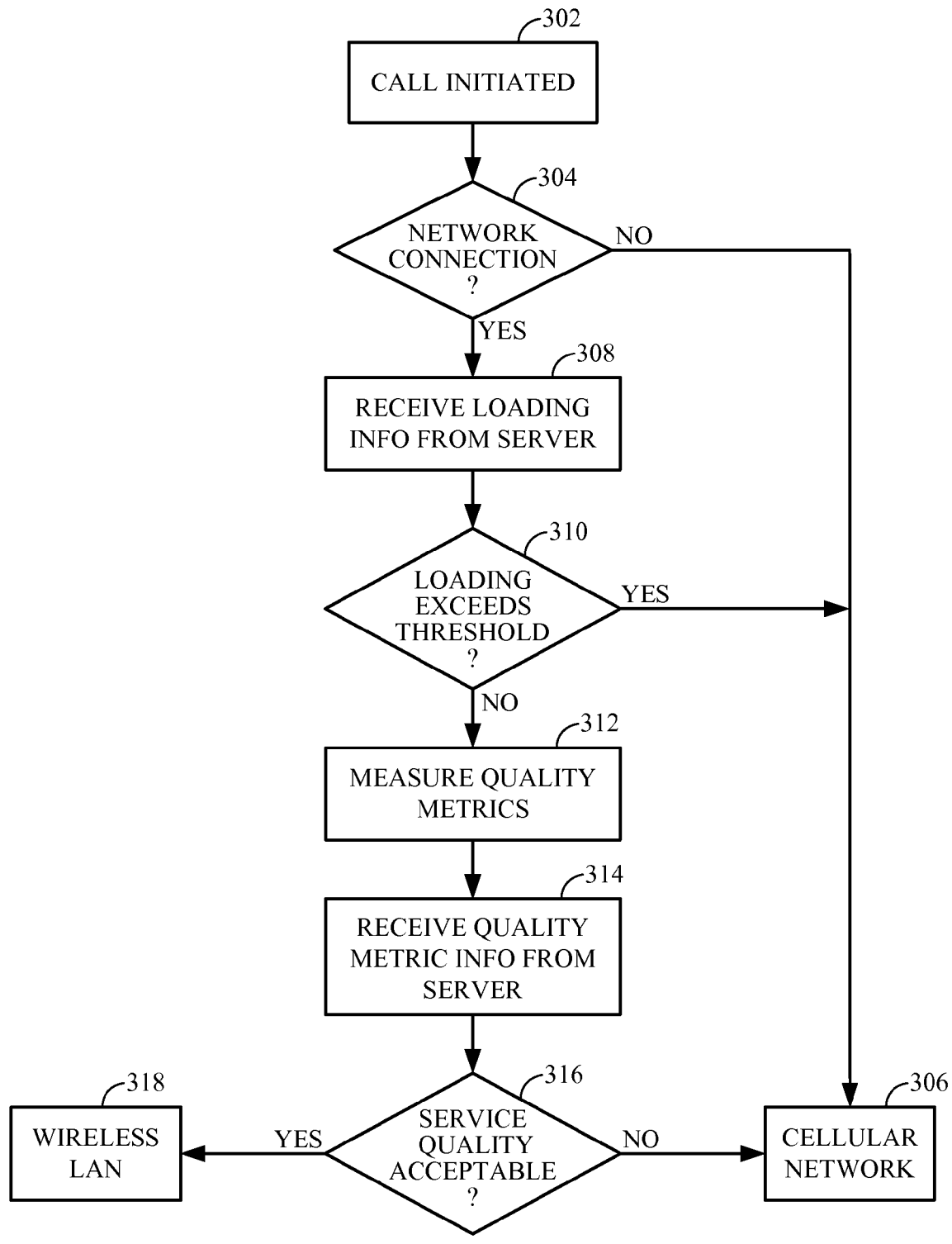
FIG. 3 is a flow diagram illustrating the functionality of an algorithm in the mobile device during call set up.

FIG. 3 is a flow diagram illustrating the functionality of the algorithm during call set up. In step 302, the algorithm is enabled once a call is either placed from the mobile device, or received by the mobile device. Once enabled, the algorithm determines in step 304 whether a network connection has been established between the mobile device and the server. If not, the algorithm signals the processor to set up the call on the cellular network in step 306. However, if a network connection exists, the algorithm will begin receiving information from the server. This information, along with local measurements made by the mobile device, may be used to by the algorithm to determine whether the service quality of the wireless LAN is acceptable to support the call.

In step 308, the algorithm receives information from the server. In this example, the information indicates the loading on the access point in the wireless LAN. In step 310, the algorithm determines whether the loading on the access point exceeds a threshold. If the algorithm determines that the loading on the access point exceeds the threshold, then it signals the processor to set up the call on the cellular network in step 306. The threshold may be generated in the mobile device, or alternatively, provided to the mobile device from the server over the network connection. In either case, the threshold may be fixed or adjustable based on historical information stored in the server's database.

Assuming the mobile device determines that the loading on the access point does not exceed the threshold, the process continues. In step 312, the algorithm measures various quality metrics relating to the network connection in the forward direction. The algorithm also receives information from the server in step 314. The information from the server may include various quality metrics relating to the network connection in the reverse direction. The quality metrics are evaluated by the algorithm in step 316. If the quality metrics indicate a service quality that is unacceptable, then the algorithm signals the processor to set up the call on the cellular network. Conversely, if the quality metrics indicate a service quality that is acceptable, then the algorithm signals the processor to set up the call on the wireless LAN in step 318.

Figure 4:
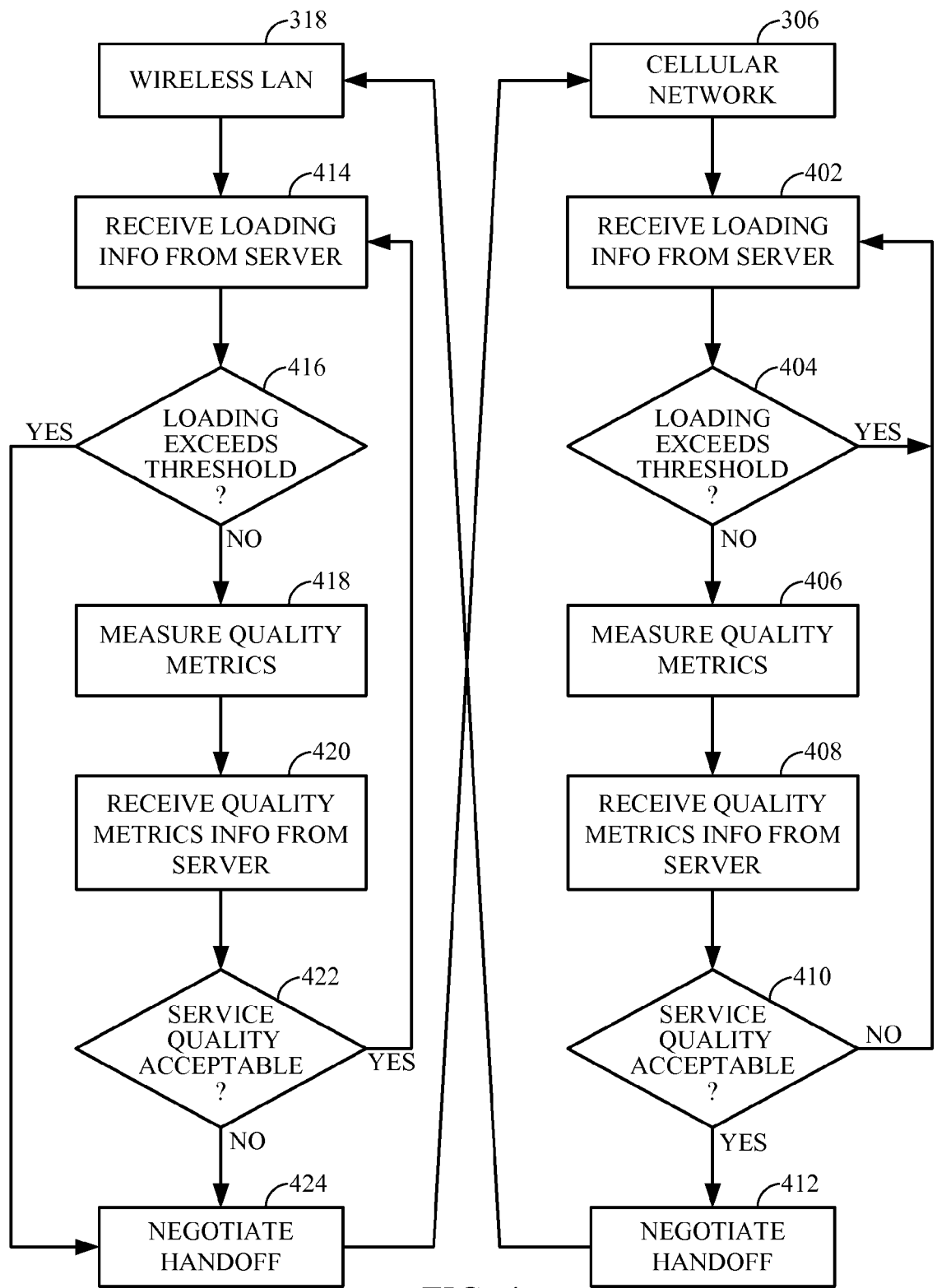
FIG. 4 is a flow diagram illustrating the functionality of the algorithm of FIG. 3 when a call is in progress.

FIG. 4 is a flow diagram illustrating the functionality of the algorithm when a call is in progress. Depending on the service quality of the wireless LAN, the call is set up on one of the two networks as described in connection with FIG. 3. If the algorithm determines that the service quality of the wireless LAN is unacceptable during call set up, then the call is set up on the cellular network in step 306. The algorithm continues to monitor the service quality of the wireless LAN as the call progresses. The algorithm receives information from the server relating the loading on the access point in step 402 and determines whether the loading on the access point exceeds a threshold in step 404. If the algorithm determines that the loading of the access point exceeds the threshold, then the call remains on the cellular network. The algorithm continues to monitor the loading on the access point in steps 402 and 404. If, on the other hand, the algorithm determines that the loading on the access point does not exceed the threshold, then the algorithm measures various quality metrics relating to the network connection in the forward direction in step 406, and receives information from the server in step 408. The information from the server may include various quality metrics relating to the network connection in the reverse direction. The quality metrics are evaluated by the algorithm in step 410. If the quality metrics indicate a service quality that is unacceptable, then the call remains on the cellular network, while the algorithm loops back to step 402 to continue monitoring the wireless LAN. Conversely, if the quality metrics indicate a service quality that is acceptable, then the algorithm signals the processor to negotiate a handoff to the wireless LAN in step 412.

Referring to step 318, the call may be initially set up on the wireless LAN as described earlier in connection with FIG. 3. In this case, the algorithm continues to monitor the service quality of the wireless LAN as the call progresses. The algorithm receives information from the server relating the loading on the access point in step 414 and determines whether the loading on the access point exceeds a threshold in step 416. If the algorithm determines that the loading on the access point exceeds the threshold, then the algorithm signals the processor to negotiate a handoff to the cellular network in step 424. Otherwise, the algorithm measures various quality metrics relating to the network connection in the forward direction in step 418 and receives information from the server in step 420. The information from the server may include various quality metrics relating to the network connection in the reverse direction. The quality metrics are evaluated by the algorithm in step 422. If the quality metrics indicate a service quality that is unacceptable, then the algorithm signals the processor to negotiate a handoff to the cellular network in step 424. If, on the other hand, the algorithm determines that the service quality of the wireless LAN is acceptable, then the call remains on the wireless LAN, while the algorithm loops back to step 414 to continue monitoring the wireless LAN.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication, comprising:
   establishing, by a mobile device, a first air interface with a cellular network access point to support a call;
   establishing a network connection with a network device, wherein the network device comprises network-determined information corresponding to a WLAN access point associated with the network connection, wherein the network-determined information comprises loading on the WLAN access point and at least one network-determined quality metric of the WLAN access point;
   receiving the network-determined information;
   determining if the loading on the WLAN access point is below a loading threshold and if the at least one network-determined quality metric meets a first standard;
   measuring, by the mobile device, at least one local quality metric corresponding to the WLAN access point if the loading on the WLAN access point is below the loading threshold and if the at least one network-determined quality metric meets the first standard;
   determining if the at least one local quality metric meets a second standard; and
   triggering a handoff of the mobile device from the first air interface to a second air interface with the WLAN access point if the loading on the WLAN access point is below the loading threshold, if the at least one network-determined quality metric meets the first standard and if the at least one local quality metric meets the second standard.

2. The method of claim 1, wherein the network-determined information further comprises historical information relating to performance of the WLAN access point, and wherein determining if the loading on the WLAN access point is below the loading threshold further comprises using a value of the loading threshold that varies depending on the historical information.

3. The method of claim 2, wherein the historical information comprises a call handling performance metric, wherein using the value of the loading threshold further comprises using a first value of the loading threshold if the call handling performance metric is above a first threshold, and using a second value of the loading threshold if the call handling performance metric is below a second threshold, wherein the first value is greater than the second value.

4. The method of claim 3, wherein the call handling performance metric comprises a dropped call metric.

5. The method of claim 3, wherein the first threshold equals the second threshold.

6. The method of claim 1, wherein the at least one network-determined quality metric of the WLAN access point comprises at least one of data error rate, delay, jitter or packet loss in a reverse direction from the mobile device, and wherein determining if the at least one network-determined quality metric meets the first standard further comprises determining if the at least one of the data error rate, delay, jitter or packet loss in the reverse direction is below a maximum reverse direction standard.

7. The method of claim 6, wherein the at least one local quality metric corresponding to the WLAN access point comprises at least one of data error rate, delay, jitter or packet loss in a forward direction to the mobile device, and wherein determining if the at least one local quality metric meets the second standard further comprises determining if the at least one of the data error rate, delay, jitter or packet loss in the forward direction is below a maximum forward direction standard.

8. The method of claim 1, wherein the at least one local quality metric corresponding to the WLAN access point comprises at least one of data error rate, delay, jitter or packet loss in a forward direction to the mobile device, and wherein determining if the at least one local quality metric meets the second standard further comprises determining if the at least one of the data error rate, delay, jitter or packet loss in the forward direction is below a maximum forward direction standard.

9. The method of claim 1, wherein the establishing of the first air interface with the cellular network access point is based on determining that the network connection is not established.

10. The method of claim 1, further comprising detecting a beacon of the WLAN, and wherein establishing the network connection is triggered by the detecting.

11. The method of claim 1, further comprising:
    establishing the second air interface with the WLAN access point;

monitoring, after establishing the second air interface, if the loading on the WLAN access point continues to be below the loading threshold and if the at least one network-determined quality metric continues to meet the first standard; and triggering a subsequent handoff of the mobile device from the second air interface to the air interface or a new air interface with the cellular network if the monitoring indicates that loading on the WLAN access point is above the loading threshold, or if the at least one network-determined quality metric does not meet the first standard, or if the at least one local quality metric does not meet the second standard.

12. A computer program product for communications, comprising:
a computer-readable medium encoded with:
a first set of instructions capable of being executed by a computer for establishing, by a mobile device, a first air interface with a cellular network access point to support a call;
a second set of instructions capable of being executed by the computer for establishing a network connection with a network device, wherein the network device comprises network-determined information corresponding to a WLAN access point associated with the network connection, wherein the network-determined information comprises loading on the WLAN access point and at least one network-determined quality metric of the WLAN access point;
a third set of instructions capable of being executed by the computer for receiving the network-determined information and determining if the loading on the WLAN access point is below a loading threshold and if the at least one network-determined quality metric meets a first standard;
a fourth set of instructions capable of being executed by the computer for causing the mobile device to measure at least one local quality metric corresponding to the WLAN access point if the loading on the WLAN access point is below the loading threshold and if the at least one network-determined quality metric meets the first standard;
a fifth set of instructions capable of being executed by the computer for determining if the at least one local quality metric meets a second standard; and
a sixth set of instructions capable of being executed by the computer for triggering a handoff of the mobile device from the first air interface to a second air interface with the WLAN access point if the loading on the WLAN access point is below the loading threshold, if the at least one network-determined quality metric meets the first standard and if the at least one local quality metric meets the second standard.

13. The computer program product of claim 12, wherein the network-determined information further comprises historical information relating to performance of the WLAN access point, and wherein the third set of instructions for determining if the loading on the WLAN access point is below the loading threshold further comprises instructions for using a value of the loading threshold that varies depending on the historical information.

14. At least one processor for use communications for a mobile device, comprising:
a first module for establishing a first air interface with a cellular network access point to support a call on the mobile device;
a second module for establishing a network connection with a network device, wherein the network device comprises network-determined information corresponding to a WLAN access point associated with the network connection, wherein the network-determined information comprises loading on the WLAN access point and at least one network-determined quality metric of the WLAN access point;
a third module comprising hardware for receiving the network-determined information and determining if the loading on the WLAN access point is below a loading threshold and if the at least one network-determined quality metric meets a first standard;
a fourth module for causing the mobile device to measure at least one local quality metric corresponding to the WLAN access point if the loading on the WLAN access point is below the loading threshold and if the at least one network-determined quality metric meets the first standard;
a fifth module for determining if the at least one local quality metric meets a second standard; and
a sixth module for triggering a handoff of the mobile device from the first air interface to a second air interface with the WLAN access point if the loading on the WLAN access point is below the loading threshold, if the at least one network-determined quality metric meets the first standard and if the at least one local quality metric meets the second standard.

15. The computer program product of claim 14, wherein the network-determined information further comprises historical information relating to performance of the WLAN access point, and wherein the third module for determining if the loading on the WLAN access point is below the loading threshold further uses a value of the loading threshold that varies depending on the historical information.

16. A mobile device for communications, comprising:
means for establishing a first air interface with a cellular network access point to support a call;
means for establishing a network connection with a network device, wherein the network device comprises network-determined information corresponding to a WLAN access point associated with the network connection, wherein the network-determined information comprises loading on the WLAN access point and at least one network-determined quality metric of the WLAN access point;
means for receiving the network-determined information;
means for determining if the loading on the WLAN access point is below a loading threshold and if the at least one network-determined quality metric meets a first standard;
means for measuring, by the mobile device, at least one local quality metric corresponding to the WLAN access point if the loading on the WLAN access point is below the loading threshold and if the at least one network-determined quality metric meets the first standard;
means for determining if the at least one local quality metric meets a second standard; and
means for triggering a handoff of the mobile device from the first air interface to a second air interface with the WLAN access point if the loading on the WLAN access point is below the loading threshold, if the at least one network-determined quality metric meets the first standard and if the at least one local quality metric meets the second standard.

17. The mobile device of claim 16, wherein the network-determined information further comprises historical information relating to performance of the WLAN access point, and wherein the means for determining if the loading on the WLAN access point is below the loading threshold further comprises means for using a value of the loading threshold that varies depending on the historical information.

18. A mobile device for communications, comprising:
a transceiver configured to establish a first air interface with a cellular network access point to support a call, to establish a network connection with a network device, and to receive network-determined information corresponding to a WLAN access point associated with the network connection, wherein the network-determined information comprises loading on the WLAN access point and at least one network-determined quality metric of the WLAN access point; and
a processor configured to determine if the loading on the WLAN access point is below a loading threshold and if the at least one network-determined quality metric meets a first standard, to measure at least one local quality metric corresponding to the WLAN access point if the loading on the WLAN access point is below the loading threshold and if the at least one network-determined quality metric meets the first standard, to determine if the at least one local quality metric meets a second standard, and to trigger a handoff of the mobile device from the first air interface to a second air interface with the WLAN access point if the loading on the WLAN access point is below the loading threshold, if the at least one network-determined quality metric meets the first standard and if the at least one local quality metric meets the second standard.

19. The mobile device of claim 18, wherein the network-determined information further comprises historical information relating to performance of the WLAN access point, and wherein in determining if the loading on the WLAN access point is below the loading threshold the processor is further configured to use a value of the loading threshold that varies depending on the historical information.

20. The mobile device of claim 19, wherein the historical information comprises a call handling performance metric, wherein the processor is further configured to use a first value of the loading threshold if the call handling performance metric is above a first threshold, and to use a second value of the loading threshold if the call handling performance metric is below a second threshold, wherein the first value is greater than the second value.

21. The mobile device of claim 20, wherein the call handling performance metric comprises a dropped call metric.

22. The mobile device of claim 20, wherein the first threshold equals the second threshold.

23. The mobile device of claim 18, wherein the at least one network-determined quality metric of the WLAN access point comprises at least one of data error rate, delay, jitter or packet loss in a reverse direction from the mobile device, and wherein in determining if the at least one network-determined quality metric meets the first standard the processor is further configured to determine if the at least one of the data error rate, delay, jitter or packet loss in the reverse direction is below a maximum reverse direction standard.

24. The mobile device of claim 23, wherein the at least one local quality metric corresponding to the WLAN access point comprises at least one of data error rate, delay, jitter or packet loss in a forward direction to the mobile device, and wherein in determining if the at least one local quality metric meets the second standard the processor is further configured to determine if the at least one of the data error rate, delay, jitter or packet loss in the forward direction is below a maximum forward direction standard.

25. The mobile device of claim 18, wherein the at least one local quality metric corresponding to the WLAN access point comprises at least one of data error rate, delay, jitter or packet loss in a forward direction to the mobile device, and wherein in determining if the at least one local quality metric meets the second standard the processor is further configured to determine if the at least one of the data error rate, delay, jitter or packet loss in the forward direction is below a maximum forward direction standard.

26. The mobile device of claim 18, wherein the transceiver is further configured to establish the first air interface with the cellular network access point based on determining that the network connection is not established.

27. The mobile device of claim 18, wherein the transceiver is further configured to detect a beacon of the WLAN, and wherein the establishing the network connection is triggered by the detecting the beacon.

28. The mobile device of claim 18, further comprising:
wherein the transceiver is further configured to establish the second air interface with the WLAN access point;
wherein the processor is further configured to monitor, after establishing the second air interface, if the loading on the WLAN access point continues to be below the loading threshold and if the at least one network-determined quality metric continues to meet the first standard; and
wherein the processor is further configured to trigger a subsequent handoff of the mobile device from the second air interface to the air interface or a new air interface with the cellular network if the monitoring indicates that loading on the WLAN access point is above the loading threshold, or if the at least one network-determined quality metric does not meet the first standard, or if the at least one local quality metric does not meet the second standard.

* * * * *